W. C. RANDS.
WEATHER STRIP.
APPLICATION FILED MAR. 31, 1915.
1,159,867.
Patented Nov. 9, 1915.
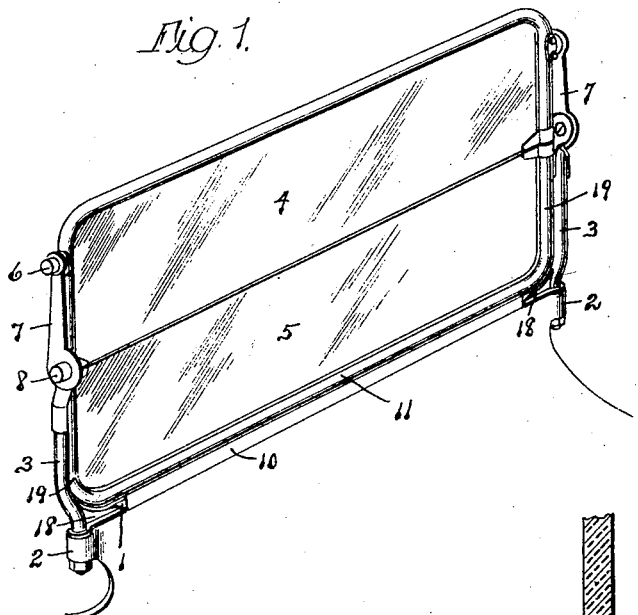
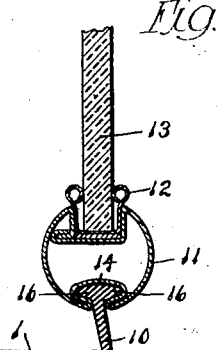
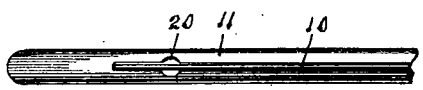
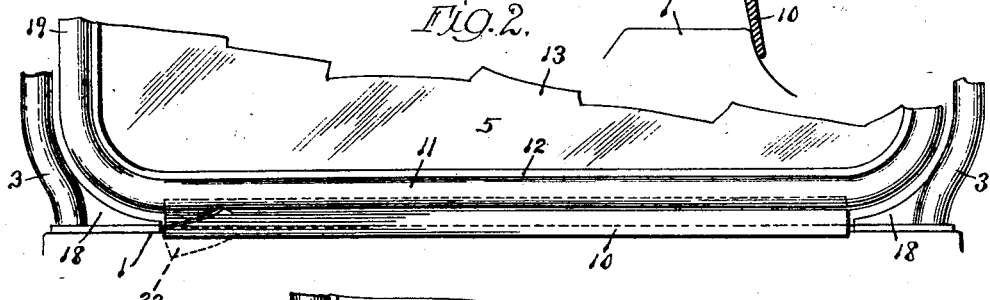
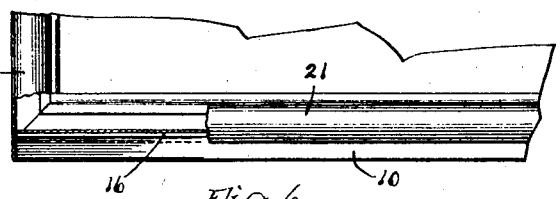
WITNESSES
INVENTOR
W. C. Rands
By Paquin & Spencer
ATTORNEYS

UNITED STATES PATENT OFFICE.

WILLIAM C. RANDS, OF DETROIT, MICHIGAN.

WEATHER-STRIP.

1,159,867.  Specification of Letters Patent.  Patented Nov. 9, 1915.

Application filed March 31, 1915. Serial No. 18,257.

*To all whom it may concern:*

Be it known that I, WILLIAM C. RANDS, a citizen of the United States, residing at Detroit, in the county of Wayne and State of Michigan, have invented a new and useful Weather-Strip, of which the following is a specification.

This invention relates to means for closing the openings between window casings and swinging sashes, more particularly between the stationary body of an automobile and the lower cross bar of a wind-shield sash, and its object is to provide an improved weather-strip and means for retaining it in proper position.

This invention consists, in combination with a weather-strip formed of a comparatively thin strip of rubber provided with a double flange along one edge, of a tube formed with an interior channel to receive said double flange, which tube constitutes the lower cross bar of a frame or sash that supports a pane of glass.

In the accompanying drawing, Figure 1 is a perspective view of a wind-shield. Fig. 2 is an elevation of the lower edge of the lower section thereof on a larger scale. Fig. 3 is a portion of an edge view of this lower section. Fig. 4 is a vertical section thereof. Fig. 5 is an elevation of a lower edge of a wind-shield of slightly different construction. Fig. 6 is an edge view thereof.

Similar reference characters refer to like parts throughout the several views.

In Fig. 1, the rail 1 of an automobile is shown formed with ears 2 to receive the lower ends of the upright posts 3 on which the upper section 4 and lower section 5 of a wind-shield are mounted, the former on pivots 6 carried by the upper ends of the links 7 and the latter directly on the pivots 8 which carry the links 7. Each section consists of a sash, a sheet of glass and means to hold the sheet of glass in position. While the lower sash is shown to extend along the bottom and up the sides of the sheet of glass supported thereby, this is merely an immaterial detail. Any other proper device may be employed to pivotally support this section.

To prevent rain and snow from driving through between the sash and the body or rail 1, a strip 10 of rubber is mounted on the tubular lower cross bar 11 of the sash, and the construction of this weather-strip and the manner of mounting it constitutes the subject matter of the present invention. Referring especially to Fig. 4, this tubular lower portion 11 is shown to be generally cylindrical with an interior channel to receive the weather strip 10 and another channel to receive the sheet or pane 13 of glass.

At the lower portion of the tube 11 is formed a channel portion 14, integral with the tube, and substantially elliptical in cross section, being united to the shell of the tube along two parallel lines that are slightly separated to permit the flat weather-strip 10 to extend between them, the double flanges 16 at the inner edge of this strip being within the channel. This results in a sash bar having a continuous cylindrical surface extending from the pane of glass, in both directions, to the weather-strip. This strip 10 is sufficiently flexible to bend when the sash is swung across the rail 1, as indicated in Fig. 4. Felt may be used instead of rubber.

The length of weather-strip will vary with the different sashes on which it is mounted. In Figs. 1 and 2, the posts 3 are shown to have inwardly extending flanges 18, and the weather-strip extends across between them. In Figs. 5 and 6, where a sash is shown with square corners, the weather-strip extends substantially the entire length of the lower bar 21.

The slit in the lower bar, through which the strip 10 extends, might be objectionable if it extended along the side bars 19 or 22. These side bars may therefore be formed of tubing, similar in cross-section and diameter to the tubes 11 and 21 excepting that the channel 14 is lacking. The side bars are preferably welded to the bottom bar so as to constitute a continuous structure, either end-to-end, as in Fig. 1, or mitered, as in Fig. 5.

To permit the introduction of the weather-strip when the ends of the channel 14 are closed, a hole 20 is drilled at any desired point through the wall of the shell and the outer walls of the channel 14, preferably near one end thereof, so that the double flange 16 may be inserted and the weather strip then pulled along until the entire strip is properly positioned. The dotted lines 23 (Fig. 2) indicate how the final end of the weather-strip will hang from this hole. To position this end, the resilient rubber is compressed along its length until the entire strip is within the channel to the right of the hole 20 (Figs. 2 and 3) whereupon the strip is allowed to expand longitudinally and force its left end into that portion of the channel 14 to the left of the hole 20.

The structure is very pleasing in appearance and very effective. Its details and proportions can be varied to suit the various conditions under which it is to be used without departing from the spirit of my invention as expressed in the claims. Should the weather-strip become worn out or be injured, it can be removed and a new one inserted in very few minutes. While I have described this invention as embodied in the lower cross bar of a wind-shield, it is evident that it may be embodied in many other forms of window sashes.

I claim:—

1. In a wind-shield construction, a tubular bar having integral portions of its wall reëntrant to produce a substantially elliptical channel, a weather strip mounted on said bar to normally extend radially with one longitudinal edge between the reëntrant portions of said bar and having an enlargement along said edge within the channel.

2. In a wind-shield construction, a tubular bar having portions of its wall reëntrant to produce a substantially elliptical channel, a weather strip mounted on said bar to normally extend radially with one longitudinal edge between the reëntrant portions of said bar and having an enlargement along said edge within the channel, the bar being formed with a hole through its wall and through the wall of the channel to permit the passage of the enlarged portion of the weather strip.

3. In a wind-shield construction, a tubular bar having portions of its wall reëntrant to produce a substantially elliptical channel, a weather strip mounted on said bar to normally extend radially with one longitudinal edge between the reëntrant portions of said bar and having an enlargement along said edge within the channel, the bar being formed with a hole through the reëntrant portions into the channel to permit the passage of the enlargement along the edge of said strip into the channel.

4. In a wind-shield construction, a tubular bar consisting of an exterior shell and an interior channel integral therewith and connecting thereto along two slightly separated parallel lines, said bar having a hole of substantially the width of the channel and symmetrical thereto through the walls of the shell and of the channel at their lines of union, a thin strip of rubber having one edge extending into the channel between the lines of union of the shell and channel, and means to hold the strip in position.

In testimony whereof I sign this specification in the presence of two subscribing witnesses.

WILLIAM C. RANDS.

Witnesses:
EDWARD N. PAGELSEN,
HUGO W. KREINBRING.